(12) United States Patent
Persaud et al.

(10) Patent No.: US 9,504,909 B2
(45) Date of Patent: Nov. 29, 2016

(54) METHOD AND APPARATUS OF PROXIMITY AND STUNT RECORDING FOR OUTDOOR GAMING

(75) Inventors: Anthony G. Persaud, San Diego, CA (US); Adrian J. Prentice, San Diego, CA (US); George Joseph, San Diego, CA (US); Mark R. Storch, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1115 days.

(21) Appl. No.: 13/274,556

(22) Filed: Oct. 17, 2011

(65) Prior Publication Data

US 2012/0283016 A1 Nov. 8, 2012

Related U.S. Application Data

(60) Provisional application No. 61/482,937, filed on May 5, 2011.

(51) Int. Cl.
*A61B 5/11* (2006.01)
*A63F 13/211* (2014.01)
(Continued)

(52) U.S. Cl.
CPC .............. *A63F 13/211* (2014.09); *A63F 13/06* (2013.01); *A63F 13/218* (2014.09); *A63F 13/235* (2014.09); *A63F 13/245* (2014.09); *A63F 13/807* (2014.09); *A63F 2300/105* (2013.01); *A63F 2300/1031* (2013.01);
(Continued)

(58) Field of Classification Search
CPC ................... A61B 2562/0219; A61B 5/4528; A61B 5/1126; A61B 5/6895; A61B 5/11; G06F 3/011; G06F 3/0414; G06K 9/00335; G06K 9/00342; A63B 24/0062; A63B 2220/13; A63B 2220/836; A63B 2220/833; A63B 2220/40
USPC ................ 342/104, 109; 382/103, 107, 154; 702/94, 141, 150, 153
See application file for complete search history.

(56) References Cited

U.S. PATENT DOCUMENTS

| 5,009,501 A | 4/1991 | Fenner et al. |
| 5,616,078 A | 4/1997 | Oh |

(Continued)

FOREIGN PATENT DOCUMENTS

| CN | 1919388 A | 2/2007 |
| GB | 2428591 A | 2/2007 |

(Continued)

OTHER PUBLICATIONS

Co-pending U.S. Appl. No. 13/078,400, filed Apr. 1, 2011.

(Continued)

*Primary Examiner* — Toan Le
*Assistant Examiner* — Jeffrey Aiello
(74) *Attorney, Agent, or Firm* — Brian Momeyer

(57) ABSTRACT

Apparatuses for motion capture are disclosed that includes a surface configured to support an object; and at least one sensor arranged with the surface, wherein the at least one sensor is configured to obtain at least one of ranging or inertial information for use in estimating a motion of the surface with respect to the object. A method for motion capture is also disclosed that includes providing a surface configured to support an object; and obtaining at least one of ranging or inertial information for use in estimating a motion of the surface with respect to the object via at least one sensor.

46 Claims, 8 Drawing Sheets

(51) Int. Cl.
  *A63F 13/235* (2014.01)
  *A63F 13/218* (2014.01)
  *A63F 13/245* (2014.01)
  *A63F 13/807* (2014.01)
  *A63F 13/20* (2014.01)

(52) U.S. Cl.
  CPC .......... *A63F 2300/1043* (2013.01); *A63F 2300/1056* (2013.01); *A63F 2300/1062* (2013.01); *A63F 2300/1068* (2013.01); *A63F 2300/8041* (2013.01)

(56) References Cited

U.S. PATENT DOCUMENTS

| | | | |
|---|---|---|---|
| 5,963,891 | A | 10/1999 | Walker et al. |
| 5,971,091 | A * | 10/1999 | Kamen et al. ............... 180/218 |
| 6,050,357 | A * | 4/2000 | Staelin et al. ............... 180/65.1 |
| 6,539,336 | B1 | 3/2003 | Vock et al. |
| 6,543,564 | B1 * | 4/2003 | Kamen et al. ............. 180/89.13 |
| 6,543,769 | B1 | 4/2003 | Podoloff et al. |
| 6,581,714 | B1 * | 6/2003 | Field et al. ................... 180/333 |
| 6,784,826 | B2 | 8/2004 | Kane et al. |
| 7,000,469 | B2 | 2/2006 | Foxlin et al. |
| 7,004,271 | B1 * | 2/2006 | Kamen et al. ................... 180/21 |
| 7,173,604 | B2 | 2/2007 | Marvit et al. |
| 7,264,554 | B2 | 9/2007 | Bentley |
| 7,365,647 | B2 | 4/2008 | Nativ |
| 7,420,472 | B2 | 9/2008 | Tran |
| 7,602,301 | B1 | 10/2009 | Stirling et al. |
| 7,628,074 | B2 * | 12/2009 | Vannucci et al. ................ 73/597 |
| 7,640,106 | B1 | 12/2009 | Stokar et al. |
| 7,733,224 | B2 | 6/2010 | Tran |
| 7,777,626 | B2 | 8/2010 | Brommer et al. |
| 7,782,755 | B2 | 8/2010 | Yu |
| 7,821,407 | B2 | 10/2010 | Stirling et al. |
| 7,831,932 | B2 | 11/2010 | Josephsoon et al. |
| 7,877,224 | B2 | 1/2011 | Ohta |
| 7,931,604 | B2 | 4/2011 | Zohar et al. |
| 7,952,483 | B2 | 5/2011 | Ferguson et al. |
| 7,995,644 | B2 | 8/2011 | Sahinoglu et al. |
| 7,996,496 | B2 | 8/2011 | Haartsen et al. |
| 7,996,571 | B2 | 8/2011 | Salokannel |
| 8,005,257 | B2 | 8/2011 | Venetsky et al. |
| 8,126,735 | B2 | 2/2012 | Dicks et al. |
| 8,184,038 | B2 | 5/2012 | Ekbal et al. |
| 8,193,929 | B1 | 6/2012 | Siu et al. |
| 8,200,321 | B2 | 6/2012 | McCombie et al. |
| 8,368,975 | B2 | 2/2013 | Baba |
| 8,379,134 | B2 | 2/2013 | Foster |
| 8,461,988 | B2 | 6/2013 | Tran |
| 8,475,370 | B2 | 7/2013 | McCombie et al. |
| 8,489,021 | B2 | 7/2013 | Granqvist et al. |
| 8,525,673 | B2 | 9/2013 | Tran |
| 8,527,038 | B2 | 9/2013 | Moon et al. |
| 8,548,581 | B2 | 10/2013 | Chan et al. |
| 8,762,091 | B1 * | 6/2014 | Foxlin ..................... G01P 15/00 702/87 |
| 8,777,742 | B2 | 7/2014 | Sato |
| 2003/0093248 | A1 * | 5/2003 | Vock ..................... A42B 3/0433 702/188 |
| 2003/0155167 | A1 * | 8/2003 | Kamen et al. ................ 180/272 |
| 2003/0163287 | A1 * | 8/2003 | Vock ..................... A43B 3/0005 702/187 |
| 2004/0073360 | A1 * | 4/2004 | Foxlin ..................... G01C 21/16 701/517 |
| 2004/0201857 | A1 | 10/2004 | Foxlin |
| 2005/0121866 | A1 * | 6/2005 | Kamen et al. ............ 280/47.18 |
| 2007/0249288 | A1 | 10/2007 | Moallemi et al. |
| 2007/0250286 | A1 | 10/2007 | Duncan et al. |
| 2007/0259690 | A1 | 11/2007 | Julian et al. |
| 2007/0285306 | A1 | 12/2007 | Julian et al. |
| 2008/0136775 | A1 | 6/2008 | Conant |
| 2008/0191864 | A1 | 8/2008 | Wolfson |
| 2008/0214305 | A1 | 9/2008 | Addington et al. |
| 2008/0221487 | A1 | 9/2008 | Zohar et al. |
| 2008/0234023 | A1 | 9/2008 | Mullahkhel et al. |
| 2008/0262772 | A1 * | 10/2008 | Luinge et al. ................... 702/94 |
| 2009/0017782 | A1 | 1/2009 | Monat et al. |
| 2009/0203441 | A1 * | 8/2009 | Piccoli et al. ................... 463/36 |
| 2009/0234614 | A1 * | 9/2009 | Kahn et al. ................... 702/141 |
| 2010/0009752 | A1 | 1/2010 | Rubin et al. |
| 2010/0090949 | A1 | 4/2010 | Tianqiao et al. |
| 2010/0176952 | A1 * | 7/2010 | Bajcsy ..................... A61B 5/11 340/573.1 |
| 2010/0184563 | A1 | 7/2010 | Molyneux et al. |
| 2010/0201573 | A1 | 8/2010 | Lamming |
| 2010/0240345 | A1 | 9/2010 | Karrman et al. |
| 2010/0308999 | A1 | 12/2010 | Chornenky |
| 2011/0046915 | A1 * | 2/2011 | Hol ..................... G01C 21/165 702/150 |
| 2011/0059769 | A1 | 3/2011 | Brunolli |
| 2011/0124387 | A1 | 5/2011 | Sauerbrei et al. |
| 2011/0187640 | A1 | 8/2011 | Jacobsen et al. |
| 2011/0199292 | A1 | 8/2011 | Kilbride |
| 2011/0208444 | A1 | 8/2011 | Solinsky |
| 2011/0257909 | A1 * | 10/2011 | Allen et al. ..................... 702/56 |
| 2011/0269414 | A1 * | 11/2011 | Falck ..................... A61B 5/0028 455/100 |
| 2011/0292819 | A1 | 12/2011 | Ekbal et al. |
| 2011/0292820 | A1 | 12/2011 | Ekbal et al. |
| 2011/0294449 | A1 | 12/2011 | Budianu et al. |
| 2011/0294450 | A1 | 12/2011 | Budianu et al. |
| 2011/0302536 | A1 | 12/2011 | Yeap |
| 2011/0316747 | A1 | 12/2011 | Budianu et al. |
| 2012/0044062 | A1 | 2/2012 | Jersa et al. |
| 2012/0212374 | A1 | 8/2012 | Kirby et al. |
| 2012/0220233 | A1 | 8/2012 | Teague et al. |
| 2012/0249544 | A1 | 10/2012 | Maciocci et al. |
| 2012/0249590 | A1 | 10/2012 | Maciocci et al. |
| 2013/0173070 | A1 | 7/2013 | Tennyson et al. |
| 2014/0028539 | A1 | 1/2014 | Newham et al. |

FOREIGN PATENT DOCUMENTS

| | | |
|---|---|---|
| JP | 2006279649 A | 10/2006 |
| JP | 2007029236 A | 2/2007 |
| JP | 2007038001 A | 2/2007 |
| JP | 2009020656 A | 1/2009 |
| JP | 2009517047 A | 4/2009 |
| JP | 2010509000 A | 3/2010 |
| JP | 2010082340 A | 4/2010 |
| JP | 2010267199 A | 11/2010 |
| WO | 2006103676 A2 | 10/2006 |
| WO | 2007062102 A1 | 5/2007 |
| WO | 2010068901 A2 | 6/2010 |
| WO | WO-2010073180 A1 | 7/2010 |
| WO | 2012024434 A1 | 2/2012 |
| WO | 2012094143 A1 | 7/2012 |

OTHER PUBLICATIONS

Co-pending U.S. Appl. No. 13/276,742, filed Oct. 19, 2011.
Co-pending U.S. Appl. No. 13/406,355, filed Feb. 27, 2012.
Di Renzo et al. "Pulse Shape Distortion and Ranging Accuracy in UWB-based Body Area Networks for Full-Body Motion Capture and Gait Analysis," IEEE Global Telecommunications Conference [Online] 2007, pp. 3775-3780.
Hoffman et al. "Breaking the Status Quo: Improving 3D Gesture Recognition with Spatially Convenient Input Devices," IEEE Virtual Reality Conference, Mar. 2010, pp. 59-66.
Hol et al. "Tightly coupled UWB/IMU Pose Estimation," IEEE Int'l Conference on Ultra-Wideband, Sep. 2009, pp. 688-692.
International Search Report and Written Opinion—PCT/US2012/027587—ISA/EPO—Jul. 12, 2012.
MVN MoCap Product, Xsens Technologies, B. V. [online], retrieved on Jun. 6, 2012.
Young et al. "Distributed Estimation of Linear Acceleration for Improved Accuracy in Wireless Inertial Motion Capture", Proceedings of the 9th International Conference on Information Processing in Sensor Networks, pp. 256-267, Apr. 2010.

(56) References Cited

OTHER PUBLICATIONS

Zemene W Mekonnen et al "Constrained maximum likelihood positioning for UWB based human motion tracking", Indoor Positioning and Indoor Navigation (I PIN), 2010 International Conference on, IEEE, Piscataway, NJ, USA, Sep. 15, 2010, pp. 1-10, XP031810232, ISBN: 978-1-4244-5862-2-2.

Anlauff et al. "A Method for Outdoor Skateboarding Video Games". Proceedings of the 7th International Conference on Advances in Computer Entertainment Technology [Online], pp. 40-44 (2010).
"e4ride electric skateboard—user manual" http://greenskate.co.nz/assets/electricskateboardmanual.pdf (accessed Jul. 7, 2011). 4 pgs. (See p. 1.).

* cited by examiner

700

702
A SURFACE MEANS CONFIGURED TO SUPPORT AN OBJECT

704
MEANS FOR OBTAINING AT LEAST ONE OF RANGING OR INERTIAL INFORMATION FOR USE IN ESTIMATING A MOTION OF THE SURFACE WITH RESPECT TO THE OBJECT VIA AT LEAST ONE SENSOR

706
MEANS FOR ESTIMATING A MOTION OF THE SURFACE WITH RESPECT TO THE OBJECT USING THE AT LEAST ONE OF RANGING OR INERTIAL INFORMATION

FIG. 7

METHOD AND APPARATUS OF PROXIMITY AND STUNT RECORDING FOR OUTDOOR GAMING

PRIORITY CLAIM

This application claims the benefit of U.S. Provisional Patent application Ser. No. 61/482,937, entitled "METHOD AND APPARATUS OF PROXIMITY AND STUNT RECORDING FOR OUTDOOR GAMING" which was filed May 5, 2011. The entirety of the aforementioned application is herein incorporated by reference.

BACKGROUND

Field

Certain aspects of the disclosure set forth herein generally relate to motion capture and, more particularly, to a method and apparatus of proximity and stunt recording for outdoor gaming.

Background

Body tracking systems have been progressing on two different fronts. First, professional grade "motion capture" systems are available that can capture motion of an actor, athlete, player, etc. with high fidelity for use by movie and game studios, for example. These systems are typically high-cost, and thus not suitable for consumer grade applications. Second, consumer grade game controllers have progressed recently from being based on button or mechanical switches, to being based on player movement detection. Since these are consumer products, the technology is much lower cost, and in general, much lower in the quality of performance as well. For example, in the Nintendo Wii® system, low-cost inertial sensors can detect hand motion that is used to control the game play. Issues with the accuracy of this type of game control have driven the rise in use of camera-based motion capture. For example, the Sony PlayStation® Move system can use a camera to track a spherical feature on the handheld game controller; this input can be combined with inertial sensor data to detect motion. Furthermore, the Microsoft Kinect® system is capable of removing the controller entirely and can use combination of traditional and depth detecting cameras to detect the body motion utilizing the camera alone.

There are several areas of concern with current motion capture systems. First, these systems suffer from performance issues that limit the types of motions that are detectable and that limit the types of games and user interactions that are possible. For example, camera systems only work on things that are in the field of view of the camera, and that are not blocked by objects or people. Second, camera augmentation systems are constrained to operating in an environment where a stationary camera can be mounted and installed—most commonly in a living room or a den. Further, current camera systems used for human body motion capturing are neither scalable nor capable of being used effectively in outdoor environments due to several limiting factors including, but not limited to, occlusion, frequency interference, and weather/lighting conditions. In addition, the use of large two dimensional (2D) touch displays for manipulating three dimensional (3D) objects or controlling vehicles is not highly effective and intuitive without the use of human gesture recognition.

Further, current outdoor activities have not been modernized with mobile technology to improve the user game experience. As next generation gaming evolves in the living room with new technology described above, outdoor gaming activities can benefit from similarly added technology. While other sensors may have been used for specific athletes for highly focused competitive use cases, a low power and low cost solution for creating consumer grade sensors to enhance these outdoor gaming experiences is desirable.

Therefore, technology advances are desired to enable improvements in body tracking performance and to enable these systems to go wherever the user wants to go, whether these systems are used in a commercial or consumer application. Example commercial applications include accurate motion capture for gesture recognition in a variety of environments. Example consumer applications include mobile gaming between one or more players, and sports performance tracking and training, whether outdoors or in a gym. Further, there are many more potential applications for mobile body tracking that may emerge if such tracking technology is available at reasonable prices and sufficient performance levels.

SUMMARY

In one aspect of the disclosure, an apparatus for motion capture includes a surface configured to support an object; and at least one sensor arranged with the surface, wherein the at least one sensor is configured to obtain at least one of ranging or inertial information for use in estimating a motion of the surface with respect to the object.

In another aspect of the disclosure, an apparatus for motion capture includes means for supporting an object; and at least one sensor means arranged with the means for supporting the object, wherein the at least one sensor means is configured to obtain at least one of ranging or inertial information for use in estimating a motion of the surface with respect to the object.

In yet another aspect of the disclosure, a method for motion capture includes providing a surface configured to support an object; and obtaining at least one of ranging or inertial information for use in estimating a motion of the surface with respect to the object via at least one sensor.

In yet another aspect of the disclosure, a computer program product for motion capture includes a machine-readable medium having instructions executable for providing a surface configured to support an object; and obtaining at least one of ranging or inertial information for use in estimating a motion of the surface with respect to the object via at least one sensor.

In yet another aspect of the disclosure, an apparatus for motion capture includes an antenna; a surface configured to support an object; and at least one sensor arranged with the surface, wherein the at least one sensor is configured to obtain at least one of ranging or inertial information for use in estimating a motion of the surface with respect to the object.

BRIEF DESCRIPTION OF THE DRAWINGS

So that the manner in which the above-recited features of the disclosure set forth herein can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 7 is a diagram illustrating example means capable of performing the operations shown in FIG. 5.

DETAILED DESCRIPTION

Figure 1:
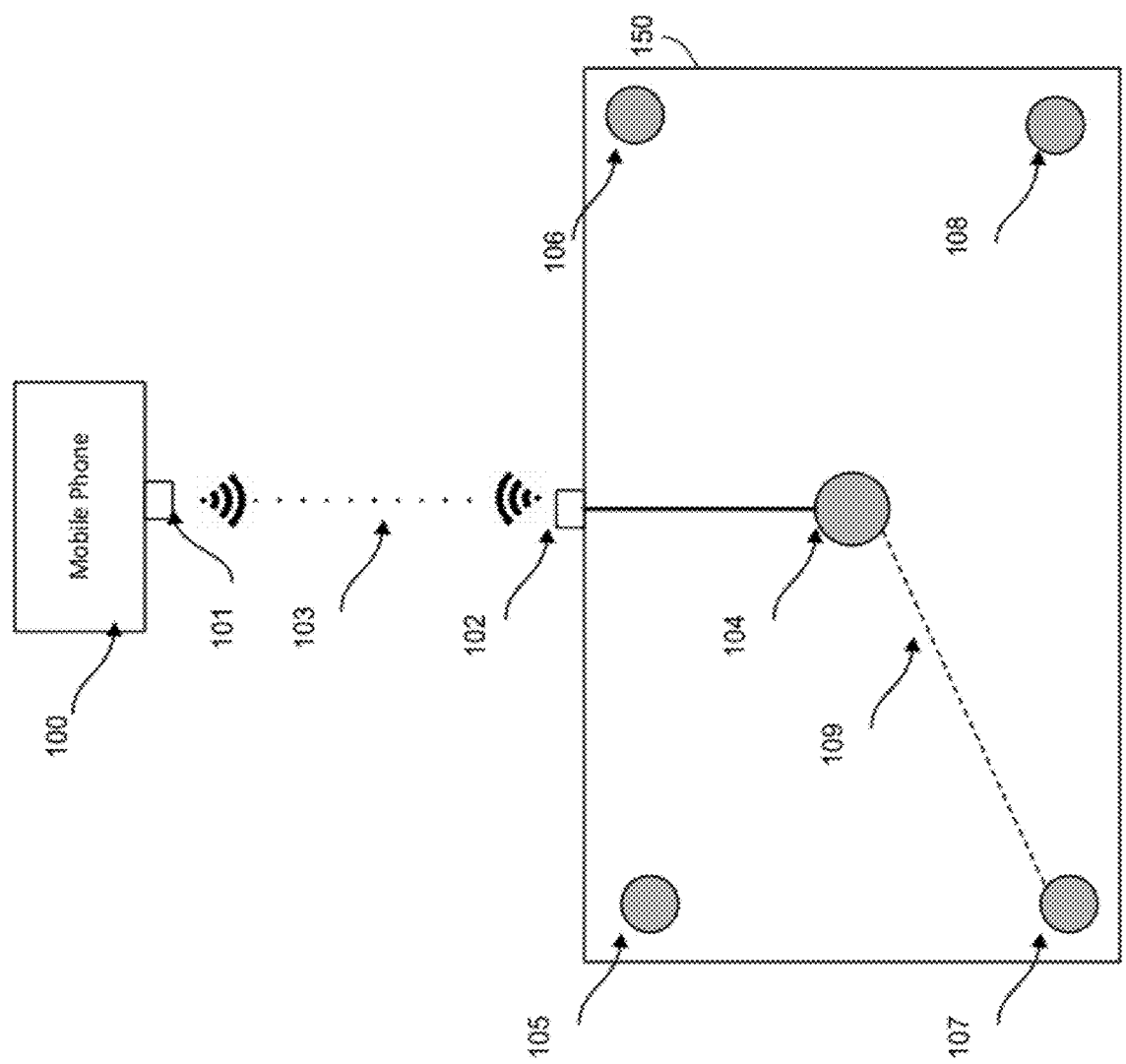
FIG. 1 is a diagram illustrating an example of a system utilizing proximity and other sensors to enable motion capture in accordance with certain aspects of the disclosure set forth herein.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Further, although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Many current outdoor activities have not been modernized with mobile technology to improve the user game experience. As next generation gaming evolves in the living room with new technology such as the Microsoft KINECT™, Playstation Move™ and Wii Remote™, outdoor gaming activities can benefit from similarly added technology. While other sensors may have been used for specific athletes for highly focused competitive use cases, low power and low cost solutions for creating consumer grade sensors to enhance these outdoor gaming experiences would be desirable.

The system disclosed herein is a skateboard with proximity sensors that motion captures and records the movements of a skateboarder while they perform tricks and stunts in various environments, including outdoor environments. In one aspect of the system set forth herein, the equipped skateboard has proximity sensors in addition to accelerometer, gyro and magnetometer sensors that track the locations of the proximity sensors being worn by the skateboarder on his/her feet. For example the proximity sensors may be integrated into their shoes. Captured stunts may be replayed and shared with friends, improving the outdoor social gaming concepts. Specifically, the system improves the gaming experience of skateboarding at skate parks and outdoor environments. Using proximity sensors with low power and high transfer rate, the data may also easily be recorded to a mobile phone with minimal intervention by the skateboarder.

Although the following description utilizes skateboards as an example, it should be noted that any sports equipment may be outfitted with the system described herein to achieve similar results. Thus, the examples provided herein should not be taken as restrictive.

The disclosed approach does not require the use of a motion capture camera and is not affected by external interference since the proximity sensors described herein uses a high frequency band not used by Wi-Fi or cell phones. Further, the proximity sensors described herein utilize extremely low power, which allow for longer external use with battery systems. The use of multiple channels provides ample transfer rate for the most data intensive proximity data.

The teachings herein may be incorporated into, implemented within, or performed by, a variety of wired or wireless apparatuses, or nodes. In some aspects, a wireless node implemented in accordance with the teachings herein may comprise a body-mounted node, a stationary estimator node, an access point, an access terminal, etc. Certain aspects of the disclosure set forth herein may support methods implemented in body area networks (BANs). The BAN represents a concept for continuous body monitoring for motion capture, diagnostic purposes in medicine, etc.

FIG. 1 illustrates a generalized example of a system that may be used for position determination and stunt recording for a skater and a skateboard. The wireless system includes a receiver console 100 that receives proximity data provided wirelessly using a wireless receiver 101. The proximity data that is transmitted by a wireless transmitter 102 to the wireless receiver 101 is encapsulated in a wireless protocol 103, and is provided by a skateboard 150.

The skateboard 150 has special integrated ranging sensors. As shown in the figure, the skateboard 150 includes a plurality of proximity sensors 105 to 108. Although in one aspect four ranging sensors are included, one in each corner, with a middle sensor that sits underneath a skater, in other implementations there may be any number of proximity sensors. Each of these proximity sensors, also referred to as nodes, may range with another node. The skateboard 150 also includes a proximity sensor 104 that acts as a node coordinator for coordinating communications between the plurality of proximity sensors 105 to 108 and the proximity data that is provided to wireless transmitter 102. In another aspect of the disclosure set forth herein, any one of the plurality of proximity sensors 105 to 108 may be used as a central node coordinator. In addition, the functionality provided by wireless transmitter 102 and wireless receiver 101 may be provided by a proximity sensor.

In one aspect of the skateboard 150, the plurality of proximity sensors 105 to 108, as well as the proximity sensor 104 and wireless transmitter 102 are mounted to a substrate made of a material suitable for use in a skateboard construction application, such as plastic or wood. Each sensor would then determine their positions relative to each other using ranging. The distances between each of the sensors may also be known as they are in predetermined positions on the board, and may be updated or recalibrated occasionally.

Figure 2:
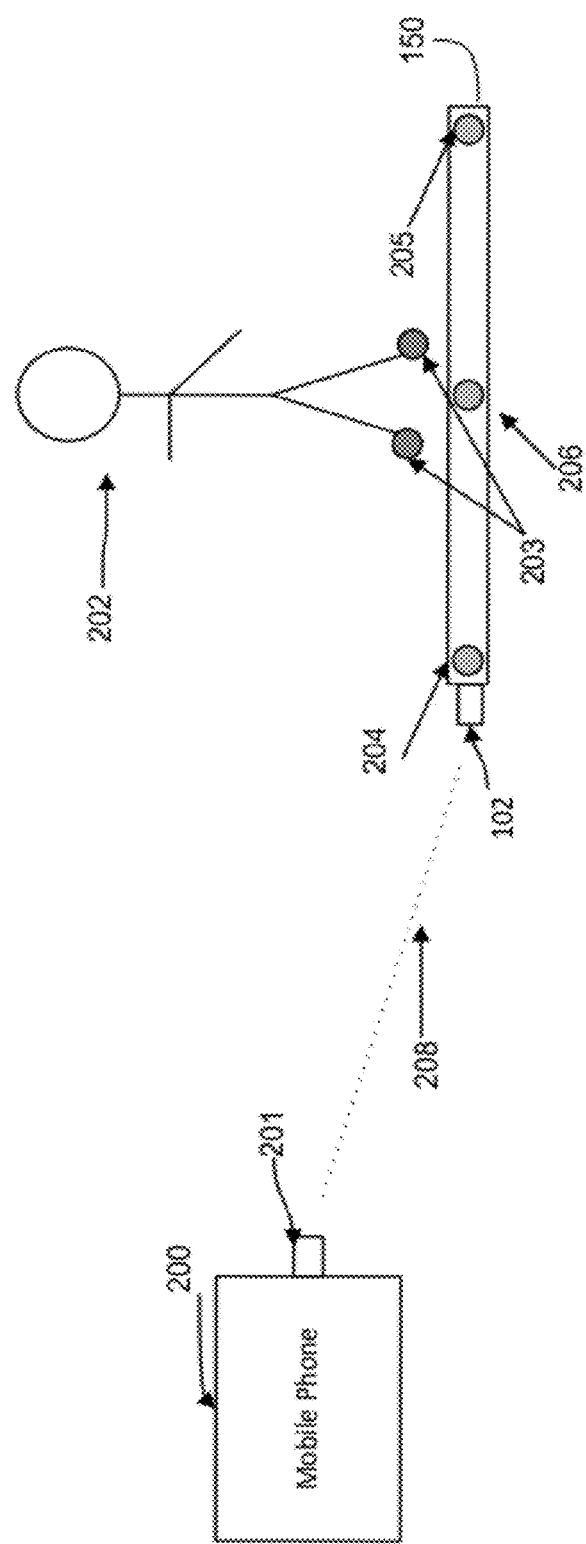
FIG. 2 is a diagram illustrating a first example of a skateboard for proximity and stunt capture using the system of FIG. 1 in accordance with certain aspects of the disclosure set forth herein.

FIG. 2 illustrates the use of the sensors in the skateboard 150 being used to provide position and stunt information to a mobile phone 200 that includes a wireless receiver 201 for receiving human position and stunt information that is wirelessly transmitted by the wireless transmitter 102 of the skateboard 150. In one aspect of the disclosed approach, a skater 202 wears a plurality of proximity sensor 203, such as one on each feet. In an aspect of the disclosure set forth herein, the proximity sensors worn on the body may mutually communicate as being part of a BAN. The BAN communicates with the proximity sensors on the skateboard 150, such as sensors 204, 205, and 206 that correspond to sensors 105, 107, and 109 of FIG. 1, respectively, to provide accurate proximity and position data of the skater's movement with respect to the skateboard 150. The BAN and the skateboard 150 may be viewed as a wireless communication system where various wireless nodes communicate using either orthogonal multiplexing scheme or a single carrier transmission. Thus, each body and skateboard-mounted node may comprise a wireless sensor that senses (acquires) one or more signals associated with a movement of the skater's body and communicates the signals to the mobile phone 200. The sensors on the skateboard 150 are used for better estimation of the skater's movements and body positions in 3D space with respect to the skateboard 150. To achieve this, calculations may be performed for each proximity sensor worn by the skater 202 and each proximity sensor on the skateboard 150. The calculations are also performed over time. In one aspect, the wireless nodes in described herein may operate in accordance with compressed sensing (CS), where an acquisition rate may be smaller than the Nyquist rate of a signal being acquired.

The mobile phone 100 will receive the data from the wireless transmitter 102 and process the ranging information to determine movement information of the body of the skater 202 with respect to the skateboard 150. The data received from the wireless transmitter 102 may also contain processed information, such as information detected from the movements of the body of the skater 202 with respect to the skateboard 150, as described herein.

In one aspect of the system disclosed herein, the information collected by the various sensors may be used to create a kinematic model for the skater 202. From this model, motions from the skater 202 may be determined, and stunts performed by the skater 202 from those motions may then be detected.

Figure 3:
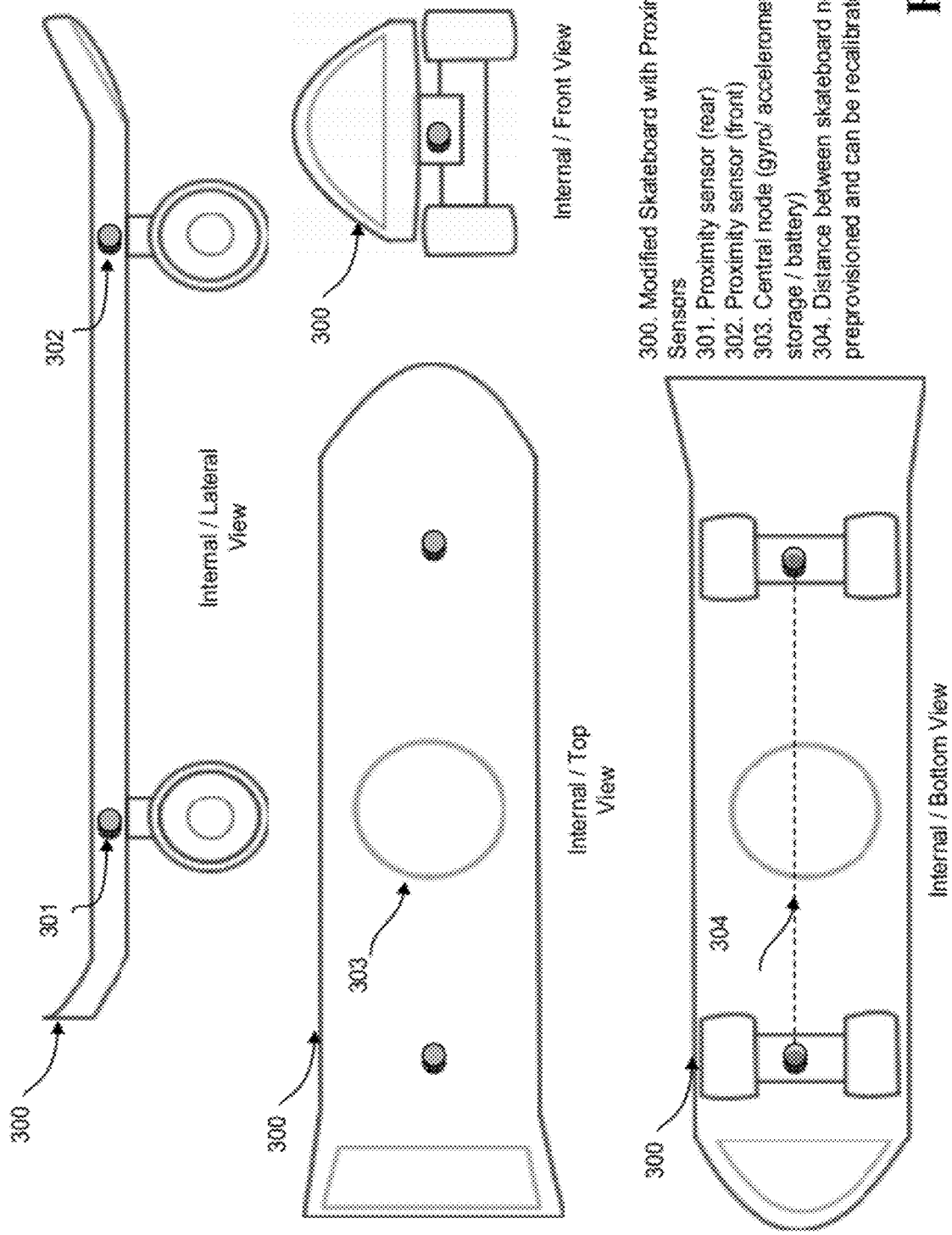
FIG. 3 is a block diagram illustrating a second example of a skateboard for proximity and stunt capture using the system of FIG. 1 in accordance with certain aspects of the disclosure set forth herein.
Figure 4:
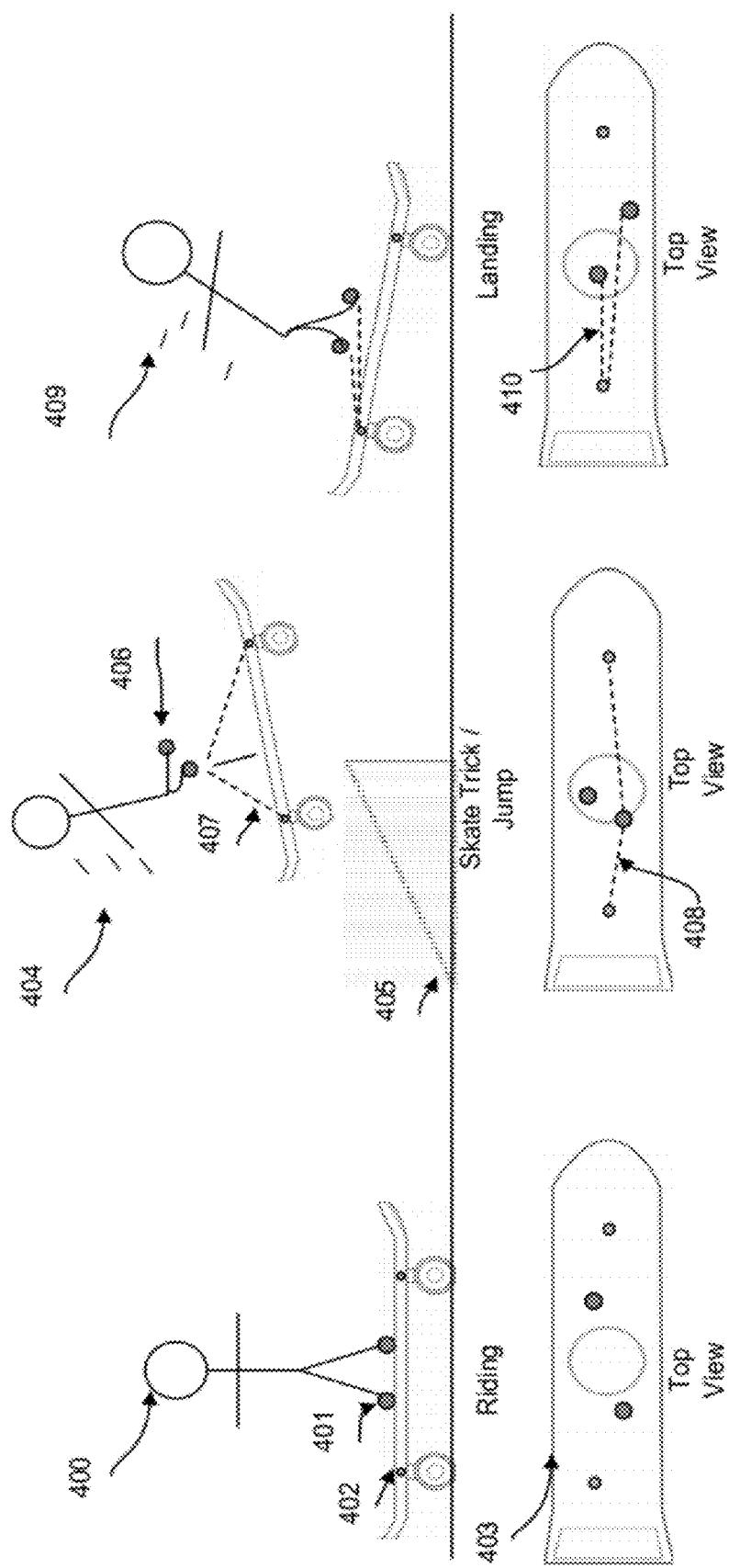
FIG. 4 is a diagram illustrating a motion and stunt capture operation for a skateboarder using the skateboard of FIG. 3 in accordance with certain aspects of the disclosure set forth herein.

Referring to FIG. 3, and also to FIG. 4, which is used to describe a system where a skater 400 is a skateboarding enthusiast who actively skates with friends at the skate park. The skater owns several skating video games, and likes to compete and try new skateboarding tricks with his friends. In the example provided herein, the skater 400 buys a new skateboard 300 from a local dealer. The skateboard 300 contains integrated proximity sensors 301 and 302 in the front and rear, respectively, of the skateboard 300. These proximity sensors 301 and 302 allow the skater 400 to track the movements and tricks of the skater 400 while the skater 400 is riding the skateboard 300 while wearing a plurality of proximity sensors 401 such as a plurality of proximity sensors 203. The skateboard 300 also includes a node 303 that may contain such other electronics such as one or more gyroscopic sensors, accelerometers, data storage, processing systems and a power source such as a battery pack to power the electronics. The node 303 may contain a wireless transmitter to transmit information. The distance between the various nodes and sensors on the skateboard 300 is pre-provisioned and can be recalibrated.

In one aspect of using the system set forth herein, before riding the skateboard 300, the skater 400 may quickly pair the new skateboard with a mobile phone such as mobile phone 200 so that information determined by the node 303 may be stored and viewed on the mobile phone or transmitted further to another device or posted on a website. The mobile phone communicates with the skateboard 300 using the node 303. Take the case, for example, where the skater 400 takes the skateboard 300 to a park to skate with friends. Before the skater 400 starts, the skater 400 pairs a phone to the skateboard 300. As the skater 400 uses the skateboard 300 to perform tricks in the skate park, the proximity sensors 301 and 302 detect tricks performed by the skater 300, including such metrics as the height, speed and distance.

For example, the skater 300 performs a trick/jump 404 with skateboard 400 over an obstacle such as a ramp 405 to allow for tricks. Because of the sensors on the skateboard 300, such as those contained in the node 303, it can detect angle changes. As the skater jumps 406, distances 407 between the proximity sensors 401 on the shoes of the skater and the proximity sensors 402 of skateboard 300 is determined by the proximity sensors. Distance changes 407 are calculated by the proximity sensors for each foot to each skateboard sensor. A top view is also shown of how each proximity distance 408 is collected by the sensors on the board during trick/jump. Once the skater 400 has landed from a trick/jump, feet sensors start getting closer to the board 409. A top view of distance 410 of sensors 401 on the skater 400 with sensors 402 on the board during landing is shown.

The system set forth herein may detect a variety of movements or tricks performed by the skater 400. For example, as the skater 400 was riding, he performed an Ollie, to a 50-50 into a Nose-slide on a rail. He was really excited that he pulled it off. Because of the sensors in the skateboard 300, the mobile phone was able to detect the moves he just pulled off and recorded it for him. In addition, the skateboard 300 may facilitate the provision of a social network site or a game service that allows the skater 400 to share accomplishments with friends, post points awarded for certain actions to an online leader board, and redeem points for rewards. For example, the skater 400 is able to go to his handset, and post a message on a social network site such as Facebook™ on the move he just performed. He can also post his combination to the game service which allows him to check-off from the list the three skateboarding tricks he just pulled off. He can now push the notification of his accomplishment to a leader board and compare his accomplishments and moves against his friends.

Figure 5:
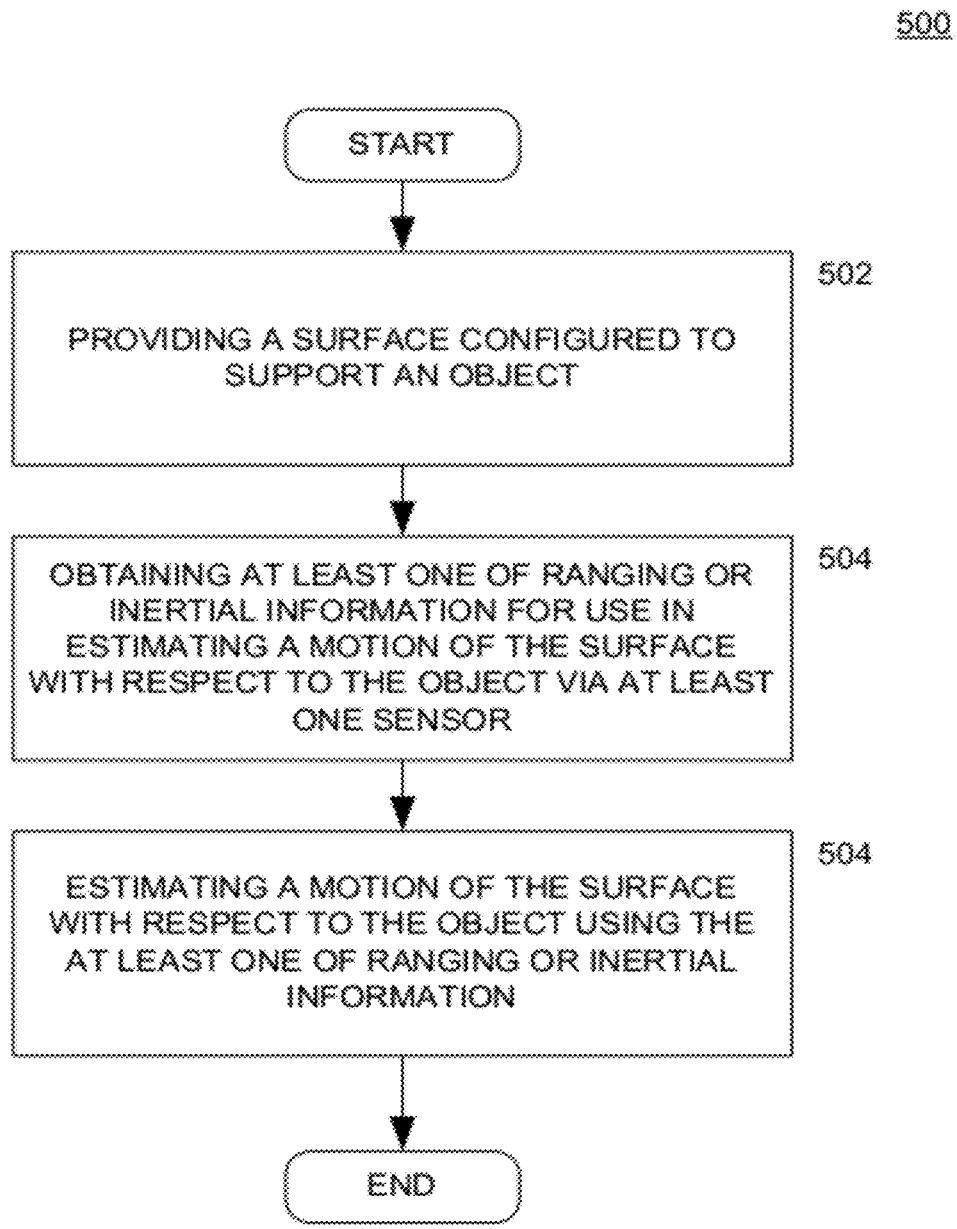
FIG. 5 is a flow diagram illustrating a motion capture operation in accordance with certain aspects of the disclosure set forth herein.

FIG. 5 illustrates a motion capture process 500 where, at 502, a surface configured to support an object is provided. At 504, obtaining at least one of ranging or inertial information for use in estimating a motion of the surface with respect to the object via at least one sensor. At 506, estimating a motion of the surface with respect to the object using the at least one of ranging or inertial information.

Figure 6:
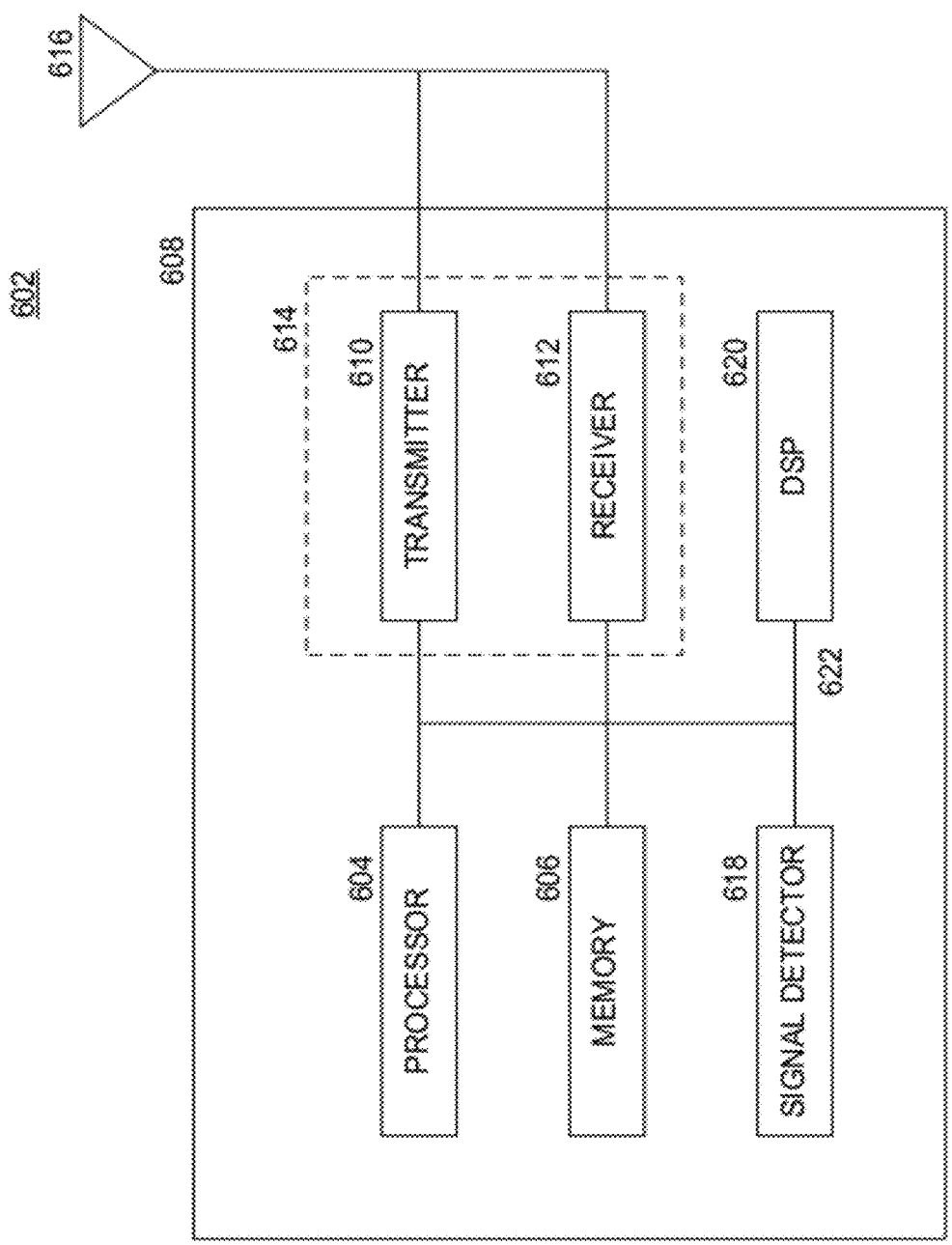
FIG. 6 is a block diagram illustrating various components that may be utilized in a wireless device of the BAN in accordance with certain aspects of the disclosure set forth herein.

FIG. 6 illustrates various components that may be utilized in a wireless device (wireless node) 600 that may be employed within the system set forth herein. The wireless device 600 is an example of a device that may be configured to implement the various methods described herein. The wireless device 600 may be used to implement any one of the proximity sensor mentioned herein, such as the plurality of proximity sensors in the skateboard, or the plurality of proximity sensor worn by the skater.

The wireless device 600 may include a processor 604 which controls operation of the wireless device 600. The processor 604 may also be referred to as a central processing unit (CPU). Memory 606, which may include both read-only memory (ROM) and random access memory (RAM), provides instructions and data to the processor 604. A portion of the memory 606 may also include non-volatile random access memory (NVRAM). The processor 604 typically performs logical and arithmetic operations based on program instructions stored within the memory 606. The instructions in the memory 606 may be executable to implement the methods described herein.

The wireless device 600 may also include a housing 608 that may include a transmitter 610 and a receiver 612 to allow transmission and reception of data between the wireless device 600 and a remote location. The transmitter 610 and receiver 612 may be combined into a transceiver 614. An antenna 616 may be attached to the housing 608 and electrically coupled to the transceiver 614. The wireless device 600 may also include (not shown) multiple transmitters, multiple receivers, multiple transceivers, and/or multiple antennas.

The wireless device 600 may also include a signal detector 618 that may be used in an effort to detect and quantify the level of signals received by the transceiver 614. The signal detector 618 may detect such signals as total energy, energy per subcarrier per symbol, power spectral density and other signals. The wireless device 600 may also include a digital signal processor (DSP) 620 for use in processing signals.

The various components of the wireless device 600 may be coupled together by a bus system 622, which may include a power bus, a control signal bus, and a status signal bus in addition to a data bus.

In many current systems, mobile body tracking may employ inertial sensors mounted to a body associated with the BAN. These systems may be limited in that they suffer from limited dynamic range and from the estimator drifts that are common with inertial sensors. Also, acceptable body motion estimation may require a large number of sensor nodes (e.g., a minimum of 15), since each articulated part of the body may require a full orientation estimate. Further, existing systems may require the performance of industrial grade inertial sensors, increasing cost, etc. For many applications, ease of use and cost are typically of the utmost importance. Therefore, it is desirable to develop new methods for reducing the number of nodes required for mobile body tracking while maintaining the required accuracy.

In various aspects of the disclosure set forth herein, ranging is referred to in various implementations. As used herein, ranging is a sensing mechanism that determines the distance between two ranging detection equipped nodes such as two proximity sensors. The ranges may be combined with measurements from other sensors such as inertial sensors to correct for errors and provide the ability to estimate drift components in the inertial sensors. According to certain aspects, a set of body mounted nodes may emit transmissions that can be detected with one or more stationary ground reference nodes. The reference nodes may have known position, and may be time synchronized to within a fraction of a nanosecond. However, having to rely on solutions utilizing stationary ground reference nodes may not be practical for many applications due its complex setup requirements. Therefore, further innovation may be desired.

Certain aspects of the disclosure set forth herein support various mechanisms that allow a system to overcome the limitations of previous approaches and enable products that have the characteristics required for a variety of applications.

It should be noted that while the term "body" is used herein, the description can also apply to capturing pose of machines such as robots. Also, the presented techniques may apply to capturing the pose of props in the activity, such as swords/shields, skateboards, racquets/clubs/bats.

As discussed herein, inertial sensors as described herein include such sensors as accelerometers, gyros or inertial measurement units (IMU). IMUS are a combination of both accelerometers and gyros. The operation and functioning of these sensors are familiar to those of ordinary skill in the art.

Ranging is a sensing mechanism that determines the distance between two equipped nodes. The ranges may be combined with inertial sensor measurements into the body motion estimator to correct for errors and provide the ability to estimate drift components in the inertial sensors. According to certain aspects, a set of body mounted nodes may emit transmissions that can be detected with one or more stationary ground reference nodes. The reference nodes may have known position, and may be time synchronized to within a fraction of a nanosecond. However, as noted previously, this system may not be practical for a consumer-grade product due its complex setup requirements. Therefore, further innovation may be desired.

In one aspect of the disclosed system, range information associated with the body mounted nodes may be produced based on a signal round-trip-time rather than a time-of-arrival. This may eliminate any clock uncertainty between the two nodes from the range estimate, and thus may remove the requirement to synchronize nodes, which may dramatically simplify the setup. Further, the proposed approach makes all nodes essentially the same, since there is no concept of "synchronized nodes" versus "unsynchronized nodes".

The proposed approach may utilize ranges between any two nodes, including between different body worn nodes. These ranges may be combined with inertial sensor data and with constraints provided by a kinematic body model to estimate body pose and motion. Whereas the previous system performed ranging only from a body node to a fixed node, removing the time synch requirement may enable to perform ranging between any two nodes. These additional ranges may be very valuable in a motion tracking estimator due to the additional range data available, and also due to the direct sensing of body relative position. Ranges between nodes on different bodies may be also useful for determining relative position and pose between the bodies.

With the use of high-accuracy round trip time ranges and ranges between nodes both on and off the body, the number and quality of the inertial sensors may be reduced. Reducing the number of nodes may make usage much simpler, and reducing the required accuracy of the inertial sensors may reduce cost. Both of these improvements can be crucial in producing a system suitable for consumer products.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, FIG. 7 illustrating an example of an apparatus 700 for motion capture. The apparatus 700 includes means for supporting an object 702; at least one sensor means 704 arranged with the means for supporting the object, wherein the at least one sensor means is configured to obtain ranging information for use in estimating a motion of the surface with respect to the object; and means 706 for estimating a motion of the surface with respect to the object using the at least one of ranging or inertial information.

Further, in general, a means for sensing may include one or more proximity sensors such as proximity sensors 105, inertial sensors, or any combinations thereof. A means for transmitting may comprise a transmitter (e.g., the transmitter unit 610) and/or an antenna 616 illustrated in FIG. 6. Means for receiving may comprise a receiver (e.g., the receiver unit 612) and/or an antenna 616 illustrated in FIG. 6. Means for processing, means for determining, or means for using may comprise a processing system, which may include one or more processors, such as the processor 604 illustrated in FIG. 6.

Figure 8:
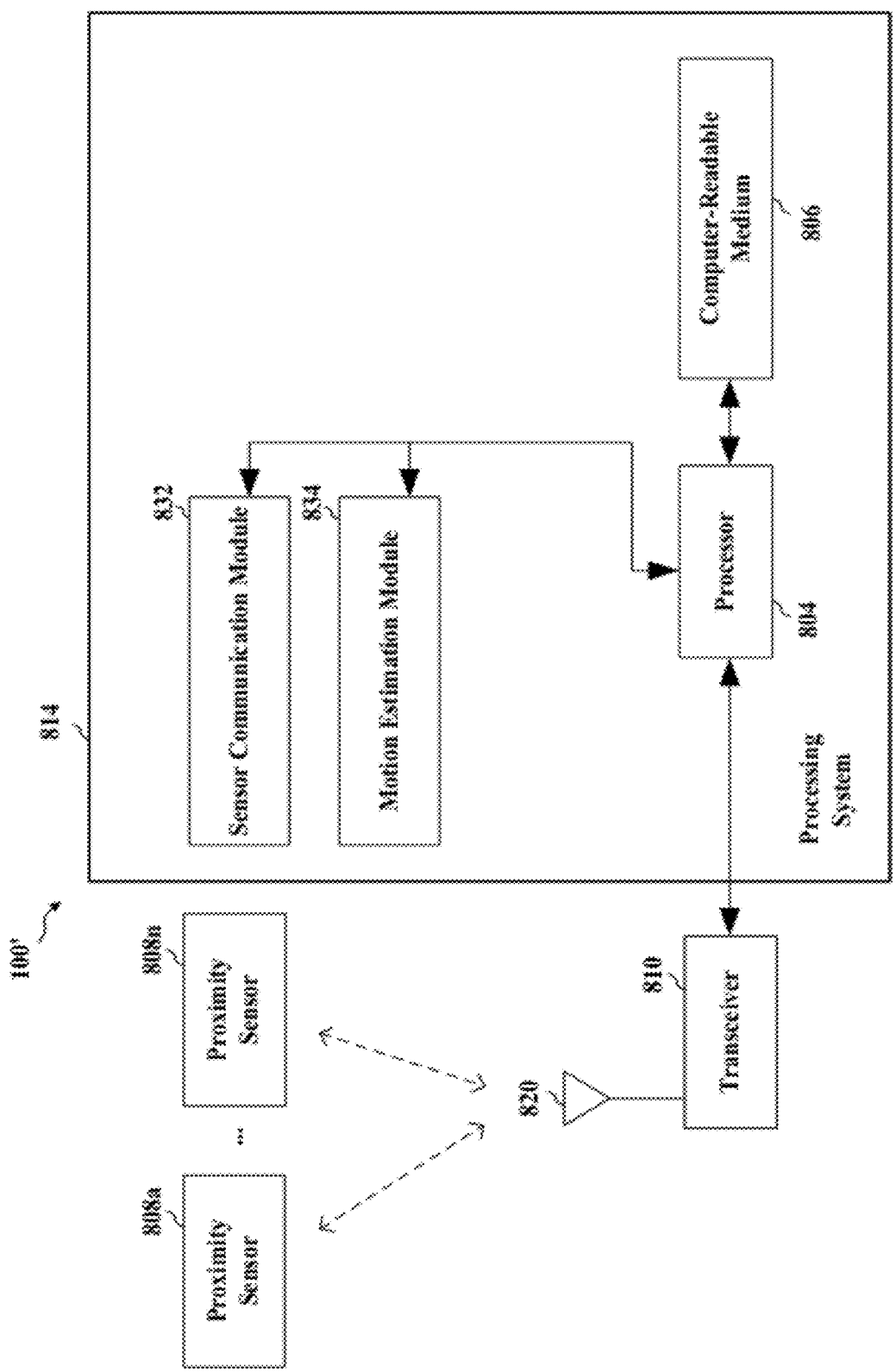
FIG. 8 is a diagram illustrating an example of a hardware implementation for an apparatus employing a processing system that may be implemented for proximity and stunt recording for outdoor gaming.

FIG. 8 is a diagram illustrating an example of a hardware implementation for the mobile phone 100 or the mobile phone 200 employing a processing system 814. The apparatus includes a processing system 814 coupled to a transceiver 810. The transceiver 810 is coupled to one or more antennas 820. The transceiver 810 provides a means for communicating with various other apparatus over a transmission medium. For example, the transceiver 810 may communicate with a plurality of proximity sensors 808a-808n, including such as those worn by the user 202 and those on the skateboard 150 described with reference to FIGS. 1 and 2. The processing system 814 includes a processor 804 coupled to a computer-readable medium 806. The processor 804 is responsible for general processing, including the execution of software stored on the computer-readable medium 806. The software, when executed by the processor 804, causes the processing system 814 to perform the various functions described supra for any particular apparatus. The computer-readable medium 806 may also be used for storing data that is manipulated by the processor 804 when executing software.

The processing system further includes a sensor communication module 832 for obtaining ranging information for use in estimating a motion of a surface such as the skateboard 150 with respect to an object such as the user 202 via at least one sensor of the plurality of proximity sensors 808a-808n; and a motion estimation module 834 for estimating a motion of the surface with respect to the object. The determined estimated motion of the surface may be stored in the processing system 814, such as in the computer-readable medium 806. The modules may be software modules running in the processor 804, resident/stored in the computer readable medium 806, one or more hardware modules coupled to the processor 804, or some combination thereof.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The various illustrative logical blocks, modules and circuits described in connection with the disclosure set forth herein may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. The steps of a method or algorithm described in connection with the disclosure set forth herein may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

A processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

As described herein, a wireless device/node in the disclosure set forth herein may include various components that perform functions based on signals that are transmitted by or received at the wireless device. A wireless device may also refer to a wearable wireless device. In some aspects the wearable wireless device may comprise a wireless headset or a wireless watch. For example, a wireless headset may include a transducer adapted to provide audio output based on data received via a receiver. A wireless watch may include a user interface adapted to provide an indication based on data received via a receiver. A wireless sensing device may include a sensor adapted to provide data to be transmitted via a transmitter.

A wireless device may communicate via one or more wireless communication links that are based on or otherwise support any suitable wireless communication technology. For example, in some aspects a wireless device may associate with a network. In some aspects the network may comprise a personal area network (e.g., supporting a wireless coverage area on the order of 30 meters) or a body area network (e.g., supporting a wireless coverage area on the order of 70 meters) implemented using ultra-wideband technology or some other suitable technology. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitter 610 and receiver 612) that may include various components (e.g., signal generators and signal processors) that facilitate communication over a wireless medium.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA") or so-called smart-phone, an entertainment device (e.g., a portable media device, including music and video players), a headset (e.g., headphones, an earpiece, etc.), a microphone, a medical sensing device (e.g., a biometric sensor, a heart rate monitor, a pedometer, an EKG device, a smart bandage, etc.), a user I/O device (e.g., a watch, a remote control, a light switch, a keyboard, a mouse, etc.), an environment sensing device (e.g., a tire pressure monitor), a monitoring device that may receive data from the medical or environment sensing device (e.g., a desktop, a mobile computer, etc.), a point-of-care device, a hearing aid, a set-top box, or any other suitable device. The monitoring device may also have access to data from different sensing devices via connection with a network.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., an access point) for a communication system. Such an access device may provide, for example, connectivity to another network (e.g., a wide area network such as the Internet or a cellular network) via a wired or wireless communication link. Accordingly, the access device may enable another device (e.g., a wireless station) to access the other network or some other functionality. In addition, it should be appreciated that one or both of the devices may be portable or, in some cases, relatively non-portable. Also, it should be appreciated that a wireless device also may be capable of transmitting and/or receiving information in a non-wireless manner (e.g., via a wired connection) via an appropriate communication interface.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for motion capture comprising:
   a surface configured to support an object; and
   a plurality of sensors integrated with the surface and a plurality of sensors included with the object, one of the plurality of sensors integrated with the surface is configured to obtain ranging information from other sensors of the plurality of sensors integrated with the surface and the plurality of sensors included with the object for use in estimating a motion of the surface with respect to the object, the ranging information comprising a distance between two sensors among the plurality of sensors integrated with the surface and the plurality of sensors included with the object, at least one of the two sensors being one of the plurality of sensors integrated with the surface and at least one of the two sensors being one of the plurality of sensors included with the object.

2. The apparatus of claim 1, further comprising a processing system configured to estimate the motion of the surface based on the ranging information.

3. The apparatus of claim 1, wherein the sensor arranged with the surface is further configured to communicate with a remote sensor arranged with a stationary node to obtain inertial information of the surface.

4. The apparatus of claim 1, wherein the sensor arranged with the surface comprises a gyroscopic sensor, a pressure sensor, a ranging sensor, a magnetometer, or an accelerometer.

5. The apparatus of claim 1, wherein the surface comprises a skateboard.

6. The apparatus of claim 1, wherein the object comprises a portion of a human body.

7. The apparatus of claim 1, wherein the ranging information further comprises ranging data for use in estimating motion of the object for use in a kinematic model.

8. The apparatus of claim 7, wherein the kinematic model of the object is determined with respect to the surface.

9. The apparatus of claim 1, wherein the sensor arranged with the surface further comprises a transceiver configured to communicate the ranging information with a remote apparatus.

10. The apparatus of claim 3, further comprising a transceiver configured to communicate the inertial information with a remote apparatus.

11. The apparatus of claim 1, further comprising a memory for storing the ranging information.

12. The apparatus of claim 1, wherein the plurality of sensors integrated with the surface are mounted to the surface.

13. The apparatus of claim 9, wherein the remote apparatus is configured to obtain the ranging information and to process the ranging information and estimate the motion of the surface and the object.

14. The apparatus of claim 13, wherein the remote apparatus is a mobile phone.

15. An apparatus for motion capture comprising:
means for supporting an object; and
a plurality of sensor means integrated with the means for supporting the object and a plurality of sensor means included with the object, one of the plurality of sensor means included with the object is configured to obtain ranging information from the plurality of sensor means integrated with the surface and other sensor means of the plurality of sensor means included with the object for use in estimating a motion of the means for supporting an object with respect to the object and a motion of the object with respect to the means for supporting an object, the ranging information comprising a distance between two sensor means among the plurality of sensor means integrated with the means for supporting the object and the plurality of sensors means included with the object, at least one of the two sensor means being one of the plurality of sensor means integrated with the means for supporting the object and at least one of the two sensor means being one of the plurality of sensor means included with the object.

16. The apparatus of claim 15, further comprising means for estimating the motion of the means for supporting the object based on the ranging information.

17. The apparatus of claim 15, wherein the sensor means arranged with the object is further configured to communicate with a remote sensor means arranged with a stationary node to obtain inertial information of the object.

18. The apparatus of claim 15, wherein the sensor means arranged with the object comprises gyroscopic sensor, pressure sensor, ranging sensor, magnetometer, or accelerometer.

19. The apparatus of claim 15, wherein the means for supporting the object comprises a skateboard.

20. The apparatus of claim 15, wherein the object comprises a portion of a human body.

21. The apparatus of claim 17, wherein the inertial information comprises inertial data for use in estimating the motion of the object for use in a kinematic model.

22. The apparatus of claim 21, wherein the kinematic model of the object is determined with respect to the means for supporting the object.

23. The apparatus of claim 15, wherein the sensor means arranged with the object further comprises a transceiver configured to communicate the ranging information with a remote apparatus.

24. The apparatus of claim 15, further comprising a transceiver configured to communicate the ranging information with a remote apparatus.

25. The apparatus of claim 17, further comprising memory means for storing the inertial information.

26. A method for motion capture comprising:
obtaining ranging information for use in estimating a motion of a surface configured to support an object with respect to the object via a plurality of sensors integrated with the surface and a plurality of sensors included with the object, one of the plurality of sensors integrated with the surface is configured to obtain ranging information from other sensors of the plurality of sensors integrated with the surface and the plurality of sensors included with the object, the ranging information comprising a distance between two sensors among the plurality of sensors integrated with the surface and the plurality of sensors included with the object, at least one of the two sensors being one of the plurality of sensors integrated with the surface and at least one of the two sensors being one of the plurality of sensors included with the object; and
estimating the motion of the surface based on the ranging information.

27. The method of claim 26, further comprising communicating with a remote sensor arranged with a stationary node to obtain inertial information of the surface.

28. The method of claim 26, wherein the sensor arranged with the surface comprises gyroscopic sensor, pressure sensor, a ranging sensor, magnetometer, or accelerometer.

29. The method of claim 26, wherein the surface comprises a skateboard.

30. The method of claim 26, wherein the object comprises a portion of a human body.

31. The method of claim 26, wherein the ranging information further comprises ranging data for use in estimating motion of the object for use in a kinematic model.

32. The method of claim 26, wherein the kinematic model of the object is determined with respect to the surface.

33. The method of claim 26, further comprising communicating the ranging information with a remote apparatus.

34. The method of claim 27, further comprising communicating the inertial information with a remote apparatus via a transceiver.

35. The method of claim 26, further comprising storing the ranging information.

36. A computer program product for motion capture comprising:
a machine-readable medium comprising instructions executable for:
obtaining ranging information for use in estimating a motion of a surface configured to support an object with respect to the object and a motion of the object with respect to the surface via a plurality of sensors integrated with the surface and a plurality of sensors included with the object, one of the plurality of sensors included with the object is configured to obtain ranging information from other sensors of the plurality of sensors included with the object and the plurality of sensors integrated with the surface, the ranging information comprising a distance between two sensors among the plurality of sensors integrated with the surface and the plurality of sensors included with the object, at least one of the two sensors being one of the plurality of sensors integrated with the surface and at least one of the two sensors being one of the plurality of sensors included with the object; and estimating the motion of the surface based on the ranging information.

37. The computer program product of claim 36, the machine-readable medium further comprising instructions executable for communicating with the sensor arranged with the object and a remote sensor arranged with a stationary node to obtain inertial information of the object.

38. The computer program product of claim 36, wherein the sensors arranged with the object comprises gyroscopic sensors, a pressure sensor, a ranging sensor, a magnetometer, or accelerometer.

39. The computer program product of claim 36, wherein the surface comprises a skateboard.

40. The computer program product of claim 36, wherein the object comprises a portion of a human body.

41. The computer program product of claim 37, wherein the inertial information comprises inertial data for use in estimating the motion of the surface for use in a kinematic model.

42. The computer program product of claim 41, wherein the kinematic model of the surface is determined with respect to the object.

43. The computer program product of claim 36, the machine-readable medium further comprising instructions executable for communicating the ranging information with a remote apparatus.

44. The computer program product of claim 36, the machine-readable medium further comprising instructions executable for communicating the ranging information with a remote apparatus via a transceiver.

45. The computer program product of claim 37, the machine-readable medium further comprising instructions executable for storing the inertial information.

46. A skateboard for motion capture comprising:
an antenna;
a board of the skateboard configured to support a person; and
a plurality of sensors integrated with the board of the skateboard and a plurality of sensors included with the person, one of the plurality of sensors integrated with the board of the skateboard is configured to obtain ranging information, through the antenna, from other sensors of the plurality of sensors integrated with the board and the plurality of sensors included with the person for use in estimating a motion of the board with respect to the person, the ranging information comprising a distance between two sensors among the plurality of sensors integrated with the board of the skateboard and the plurality of sensors included with the person, at least one of the two sensors being one of the plurality of sensors integrated with the board of the skateboard and at least one of the two sensors being one of the plurality of sensors included with the person.

* * * * *